United States Patent
Schramek-Flye (10) Patent No.: US 7,530,635 B2
(45) Date of Patent: May 12, 2009

(54) CHILD SAFETY SEAT

(76) Inventor: Kadie M. Schramek-Flye, 9857 49th Ave. North, St. Petersburg, FL (US) 33708

( * ) Notice: Subject to any disclaimer, the term of this patent is extended or adjusted under 35 U.S.C. 154(b) by 0 days.

(21) Appl. No.: 11/751,136

(22) Filed: May 21, 2007

(65) Prior Publication Data
US 2008/0290707 A1 Nov. 27, 2008

(51) Int. Cl.
A47D 1/10 (2006.01)
A47C 31/10 (2006.01)
A47C 4/02 (2006.01)

(52) U.S. Cl. .................... 297/255; 297/250.1; 297/254; 297/219.12; 297/228.12; 297/17

(58) Field of Classification Search ................. 297/255, 297/17, 228.12, 250.1, 254, 219.12, 16.1
See application file for complete search history.

(56) References Cited

U.S. PATENT DOCUMENTS

| | | | | |
|---|---|---|---|---|
| 324,839 A * | 8/1885 | Hazen | 297/254 X |
| 834,383 A * | 10/1906 | Johnson | 297/255 X |
| 1,591,571 A * | 7/1926 | Stwalley | 5/98.2 |
| 1,641,952 A * | 9/1927 | Abraham | 297/255 |
| 1,641,953 A * | 9/1927 | Abraham | 297/255 |
| 1,742,822 A * | 1/1930 | Olson | 297/255 |
| 2,359,599 A * | 10/1944 | Allen | 297/255 X |
| 2,508,822 A * | 5/1950 | Goldberg | 297/255 |
| 2,587,194 A * | 2/1952 | Mitchell | 297/255 |
| 2,601,488 A * | 6/1952 | Allen | 5/94 |
| 2,634,794 A * | 4/1953 | Young | 297/255 X |
| 2,641,773 A * | 6/1953 | Kramer | 5/94 |
| 2,731,072 A * | 1/1956 | Post | 297/255 X |
| 2,852,066 A * | 9/1958 | Hawkins | 297/255 X |
| 2,853,718 A * | 9/1958 | Lim | 5/94 |
| 2,915,154 A * | 12/1959 | Holder | 297/17 X |
| 3,003,163 A * | 10/1961 | Linden | 5/315.1 |
| 3,054,637 A * | 9/1962 | Pambello | 224/155 X |
| 3,146,026 A * | 8/1964 | Berlin | 297/255 |
| 3,366,294 A * | 1/1968 | Stephenson | 297/256.14 X |
| 3,436,770 A * | 4/1969 | Turner | 297/254 X |
| 3,574,872 A * | 4/1971 | Mattila | 5/94 |
| 3,735,430 A * | 5/1973 | Platz | 5/118 |
| 3,828,994 A * | 8/1974 | Hollins | 297/255 X |
| 3,839,754 A * | 10/1974 | Hooper | 5/98.2 |
| 4,602,816 A * | 7/1986 | Chandler | 297/19 X |
| 4,655,502 A * | 4/1987 | Houllis | 297/229 X |
| 4,666,207 A * | 5/1987 | Quartano | 297/229 |
| 4,674,800 A * | 6/1987 | Ensign | 297/465 |
| 4,865,380 A * | 9/1989 | Heitzman-Powell et al. | 297/255 X |
| 4,886,150 A * | 12/1989 | Fitzsimmons | 190/1 |
| 4,943,105 A * | 7/1990 | Kacar et al. | 297/229 X |
| 5,123,377 A * | 6/1992 | Edwards | 297/255 X |
| 5,188,421 A * | 2/1993 | Arseneault | 297/182 |

(Continued)

Primary Examiner—Rodney B White
(74) Attorney, Agent, or Firm—Frank Liebenow; Larson & Larson P.A.

(57) ABSTRACT

An application for a foldable child safety seat includes a foldable sheet for supporting the child and a set of straps for removably fastening the head area of the foldable sheet around a first anchoring object such as an airplane tray table. Another set of straps are provided for removably fastening the foot area of the foldable sheet around a second anchoring object such as a parent and a system is provided for restraining the child into the foldable sheet.

19 Claims, 6 Drawing Sheets

U.S. PATENT DOCUMENTS

| | | | |
|---|---|---|---|
| 5,205,610 A * | 4/1993 | Reninger | 297/17 X |
| 5,222,641 A * | 6/1993 | Medeiros, Jr. | 297/255 X |
| 5,224,229 A | 7/1993 | Smith | |
| 5,265,828 A | 11/1993 | Bennington | |
| 5,269,587 A * | 12/1993 | Cunningham et al. | 297/16.1 X |
| 5,310,242 A * | 5/1994 | Golder | 297/256 X |
| 5,344,212 A | 9/1994 | Muller et al. | |
| 5,354,121 A * | 10/1994 | Allum | 297/485 |
| 5,366,271 A * | 11/1994 | Johnston et al. | 297/250.1 |
| 5,385,390 A * | 1/1995 | Freeman et al. | 297/17 X |
| 5,409,293 A | 4/1995 | Nagasaka | |
| 5,499,860 A * | 3/1996 | Smith et al. | 297/255 |
| 5,692,257 A * | 12/1997 | Albertieri | 5/655 |
| 5,785,383 A * | 7/1998 | Otero | 297/17 X |
| 5,819,341 A * | 10/1998 | Simantob et al. | 5/98.1 |
| 5,897,165 A * | 4/1999 | Kucharczyk et al. | 297/256.17 X |
| 5,915,789 A * | 6/1999 | Ponce De Leon, III | 297/255 X |
| 5,957,537 A * | 9/1999 | Hoolahan | 297/250.1 X |
| 5,988,744 A * | 11/1999 | Franchak | 297/219.12 X |
| 6,182,931 B1 * | 2/2001 | Richard | 297/182 X |
| 6,206,471 B1 * | 3/2001 | McGowan | 297/256.17 |
| 6,220,662 B1 | 4/2001 | Franco-Villa et al. | |
| 6,327,726 B1 * | 12/2001 | Weber | 297/219.1 X |
| 6,402,251 B1 * | 6/2002 | Stoll | 297/255 X |
| 6,439,660 B1 * | 8/2002 | Guenther | 297/250.1 X |
| 6,474,732 B1 | 11/2002 | Merensky | |
| 6,543,722 B1 | 4/2003 | Parrow et al. | |
| 6,616,242 B1 * | 9/2003 | Stoll | 297/255 X |
| 6,767,058 B2 * | 7/2004 | McClellan-Derrickson | 297/255 |
| 6,848,743 B1 * | 2/2005 | Collins | 297/256.17 |
| 6,969,120 B2 * | 11/2005 | Levin | 297/250.1 X |
| 6,971,655 B1 * | 12/2005 | Harris | 297/250.1 X |
| 7,000,985 B2 * | 2/2006 | Belgarde | 297/255 |
| 7,021,719 B2 * | 4/2006 | Stoll | 297/255 X |
| 7,140,692 B2 * | 11/2006 | Stoll | 297/255 X |
| 7,188,899 B1 * | 3/2007 | McClellan-Derrickson | 297/256 |
| 7,261,375 B2 * | 8/2007 | Godshaw et al. | 297/228.12 |
| 7,374,241 B2 * | 5/2008 | Gold et al. | 297/255 |
| 2004/0021353 A1 * | 2/2004 | Lozano et al. | 297/255 |
| 2007/0001495 A1 * | 1/2007 | Boyle et al. | 297/250.1 X |

* cited by examiner

CHILD SAFETY SEAT

FIELD OF THE INVENTION

This invention relates to the field of child safety seats and more particularly to a baby seat/harness that is foldable and easily transported.

BACKGROUND OF THE INVENTION

Child safety seats are important for many reasons. For one, they restrain the child. It is often important to restrain a child, especially a very young child. By restraining the child, a parent or guardian can perform other tasks, knowing the child will not be getting into something that can be broken or that can hurt the child. The parent can prepare dinner, drive a car or do household tasks while the baby is safely restrained in its seat.

Most child safety seats currently in use have a rigid frame forming the seat and one or more straps that contain the child. Many child safety seats have eyelets, troughs or passages through them to accept an automobile seat belt, thereby helping to prevent the baby from mobilizing should a car accident occur. Often, such child seats are used to protect and restrain an infant when flying in an airplane. Unfortunately, the size and weight of such a child seat makes it quite difficult to carry the child seat, the infant and assorted necessities through an airport terminal.

Present child safety seats function well for their intended purposes, but are often large and difficult to transport as in U.S. Pat. No. 5,409,293 to Nagasaka. A parent with two very young children would find it almost impossible to carry two of the child safety seats as described, the infants and other necessities through an airport. Even when visiting family and friend, it is very difficult to unbuckle and remove the car seats, then carry them in while also carrying the infant, etc.

U.S. Pat. No. 6,543,722 to Barth, et al., describes one such child restraint system, intended for aircraft use. Although the described child restraint functions for its intended purpose, its size and shape makes it difficult to carry through the airport. Likewise, U.S. Pat. No. 6,474,732 to Merensky describes another child seat for airplanes. This too is bulky and would prove difficult to carry through an airport. U.S. Pat. No. 6,220,662 to Franco-Vila, et al., describes another such seat, only this seat folds up to improve its portability. Again, the size and weight of such a device would make it difficult to carry through an airport. U.S. Pat. No. 5,344,212 to Muller, et al., describes an infant seat designed to attach to the back of the passenger seat in front of the parent. This to is large, bulky and would be difficult to carry.

Child seats have been designed to attach to aircraft attach points such as that described in U.S. Pat. No. 5,265,828 to Bennington. Unfortunately, the described device has the child seated on the floor making it difficult to care for and amuse the child. Such a seat has similar inherent carrying difficulties as described above.

A protective device is described in U.S. Pat. No. 5,224,229 to Smith, but this device too, is bulky and would be difficult to carry along with the child and other items.

What is needed is a child safety seat and restraint system that comfortably holds and restrains the infant while traveling, yet folds into a compact, light-weight carrying package for ease of travel.

SUMMARY OF THE INVENTION

In one embodiment, a foldable child seat is disclosed including a foldable planar base with at least one head-end strap attached to its head area, adapted to removably fasten around a first anchoring object. At least one lower-end strap is attached to the foot area of the foldable planar base and removably fastens around a second anchoring object.

In another embodiment, a foldable child seat is disclosed including a foldable sheet for supporting the child and a set of straps for removably fastening the head area of the foldable sheet around a first anchoring object. Another set of straps are provided for removably fastening the foot area of the foldable sheet around a second anchoring object and a system is provided for restraining the child to the foldable sheet.

In another embodiment, a foldable child seat is disclosed including a foldable planar base with two head-end primary suspension straps attached to a top head area and head-end secondary suspension straps attached to a side head area, the straps are adapted to removably fasten around a first anchoring object. For removably fastening the foot area of the foldable planar base to a second object, two lower-end straps are attached to a side foot area of the foldable planar base. A child restraint system is included with two child restraint shoulder straps affixed to the foldable planar base at a head area and are removably attached to a crotch strap which is attached to a leg area of the foldable planar base.

One objective of the present invention is to provide an infant seat for use in aircraft, attaching at one end to the seat in front of the parent and at the opposite end to the parent, thereby forming a hammock-like infant seat.

Another objective of the present invention is to provide an infant seat for use in aircraft, attaching at one end to the seat in front of the parent and at the opposite end to the parent, thereby forming a hammock-like infant seat with restraint straps and clips to securely hold the infant.

Another objective of the present invention is to provide an infant seat that can be secured to a chair or chaise-lounge, thereby forming a hammock-like infant seat. Another objective of the present invention is to provide an infant seat that folds up into a compact, light-weight package.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures.

Figure 1:
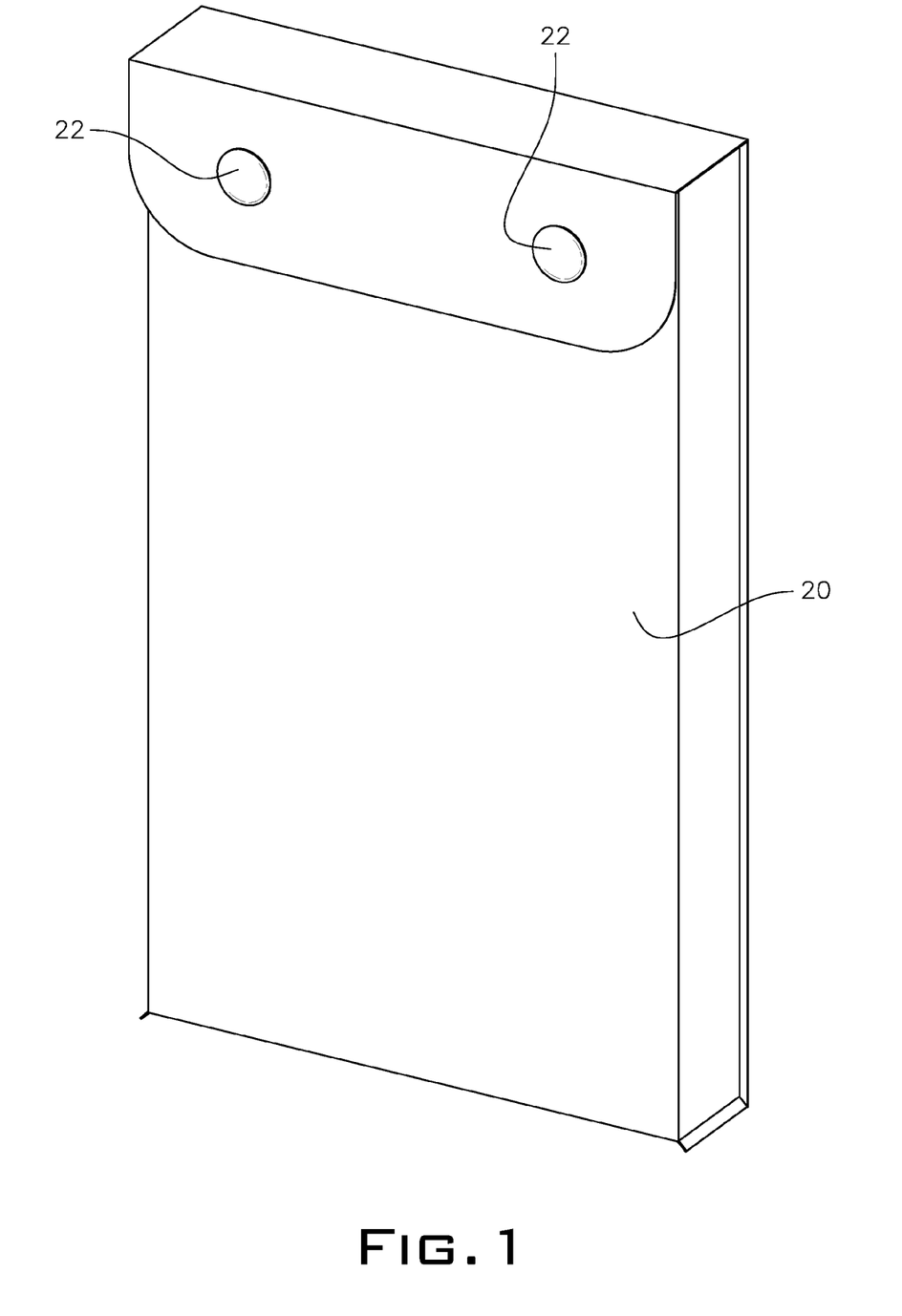
FIG. 1 illustrates a plan view of a safety seat of a first embodiment of the present invention contained within a carrying case.

Referring to FIG. 1, a plan view of a safety seat of a first embodiment of the present invention contained within a carrying case will be described. The entire child safety seat of the present invention (not visible in FIG. 1) folds and is stored in a small carrying case 20. In this exemplary carrying case, the lid is held shut with two snaps 22. Any type of carrying case is equally anticipated including a soft-sided bag-like carrying case, backpack or the like.

Figure 2:
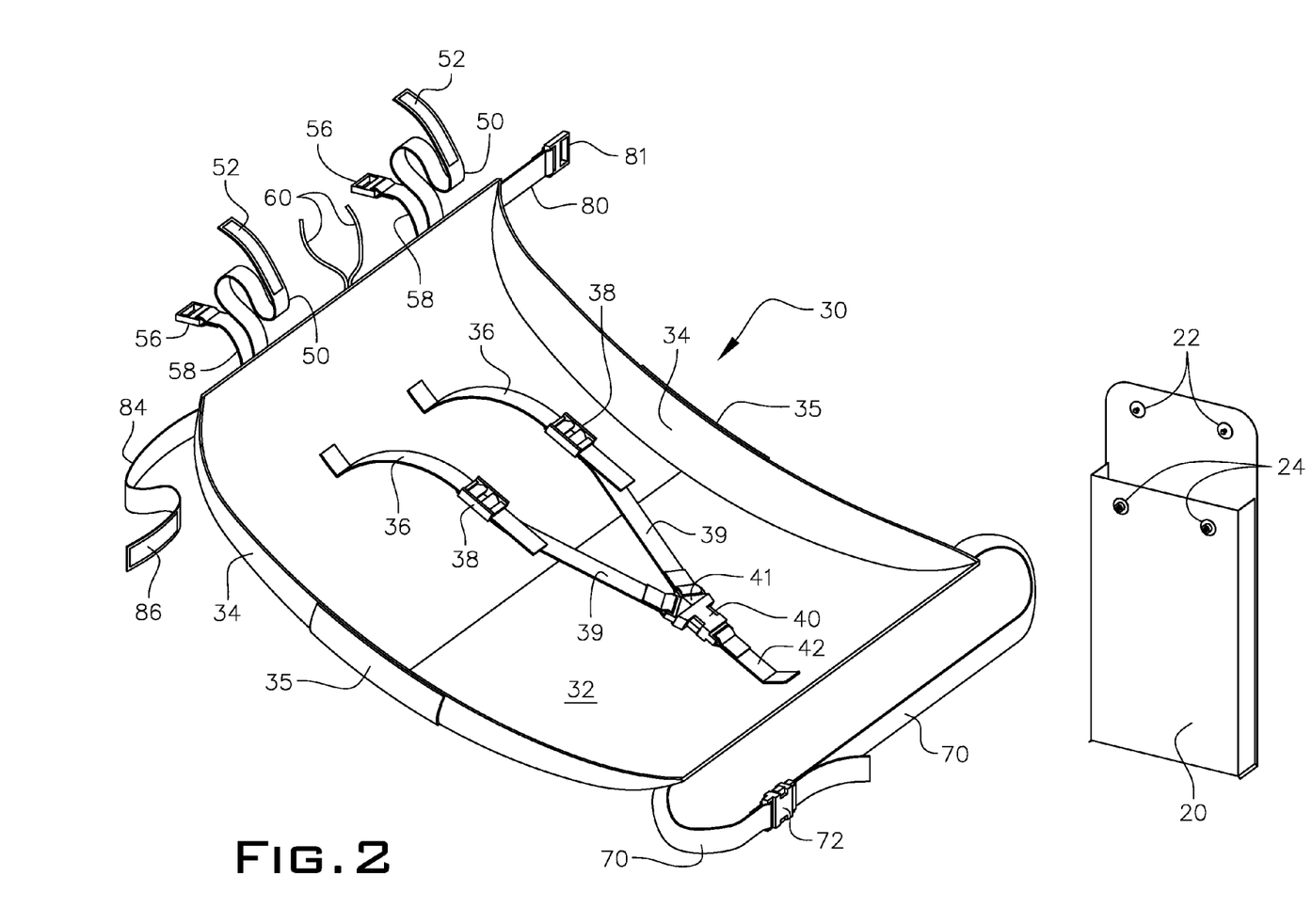
FIG. 2 illustrates a plan view of a safety seat of a first embodiment of the present invention.

Referring to FIG. 2, a plan view of a safety seat of a first embodiment of the present invention will be described. The child safety seat 30 is designed to hold a child during travel or when visiting. This withstanding, the child safety seat 30 works equally well for holding a child at home. The child safety seat 30 is preferably made from cloth for comfort, safety and ease of folding and storing. The child safety seat 30 includes a substantially planar base portion 32 and two side portions 34. In some embodiments, pockets 35 are provided to store straps or hold small baby toys. A series of straps 36/39/42 are attached to the base portion for holding the child as known in the industry. The placement of such depends upon the age, size and weight of the child, also as known in the industry. In the preferred embodiment, two shoulder straps 36/39 are attached to the shoulder area of the child safety seat 30, in some embodiments by stitching or adhesive. To accommodate size differences in children, some embodiments include adjusters 38 on the straps 36/39 to allow for shortening and lengthening. At a point near the child's mid-section, the straps 39 meet at a snap lock 41 (male snap lock shown in this example). A mating snap lock 40 attaches to a crotch strap 42 and the crotch strap 42 is attached to the planar base portion 32 at a point between the child's legs. Opening of the snap lock 40/41 allows the straps 36/39 to be lifted over the child's head, for easy removal of the child from the restraint.

The child safety seat 30 is held suspended between two objects by a series of suspension straps 50/58/80/84/70 as is shown in subsequent figures. In this embodiment, the head-end primary suspension straps 50/58 attach to a first of the two objects and includes two top primary head-end suspension straps 50 and two bottom primary head-end suspension straps 58. The bottom head-end primary suspension straps 58 are equipped with plastic loops 56. To attach the primary head-end suspension straps 50/58 to an object such as an airliner tray table, the top primary head-end suspension straps 50 are passed through the plastic loops 56 and held in place by fastener 52. In one embodiment, the fasteners 52 are snag-free hook and loop material such as Velcro®, a material that is known as single Velcro, a hook and loop material that incorporates both hooks and loops into a single material allowing it to stick to itself. In other embodiments (not shown), a series of buttons/button holes, snaps or other fasteners as known in the industry are used to adjustably fasten the top primary suspension straps 50 to themselves. In some embodiments, extra head-end suspension tie strings 60 are provided for securing the child safety seat to alternate objects (see FIGS. 4 and 5).

For added strength and safety, a secondary head-end suspension strap 80/84 is provided. A first of the secondary head-end suspension straps 80 has a plastic loop 81. The second secondary head-end suspension strap 84 has an area of snag-free hook and loop material 86 such as Velcro®. To attach the secondary head-end suspension straps 80/84 to an object such as an airplane tray table, the secondary head-end suspension straps 80/84 are passed around the object (e.g., tray table) and held in place by passing the hook and loop material 86 through the plastic loop 81 and connecting the hook and loop material 86 back onto itself or onto a mating hook and loop material (not shown).

For attaching to the other object of the two objects (e.g., a person's waist), a lower-end adjustable strap 70 is provided along with an adjustment device 72 such as a tensioner or a clip/tensioner. Any connection/tension adjusting device known in the industry is envisioned to be attached to the lower-end adjustable straps 70.

Figure 2A:
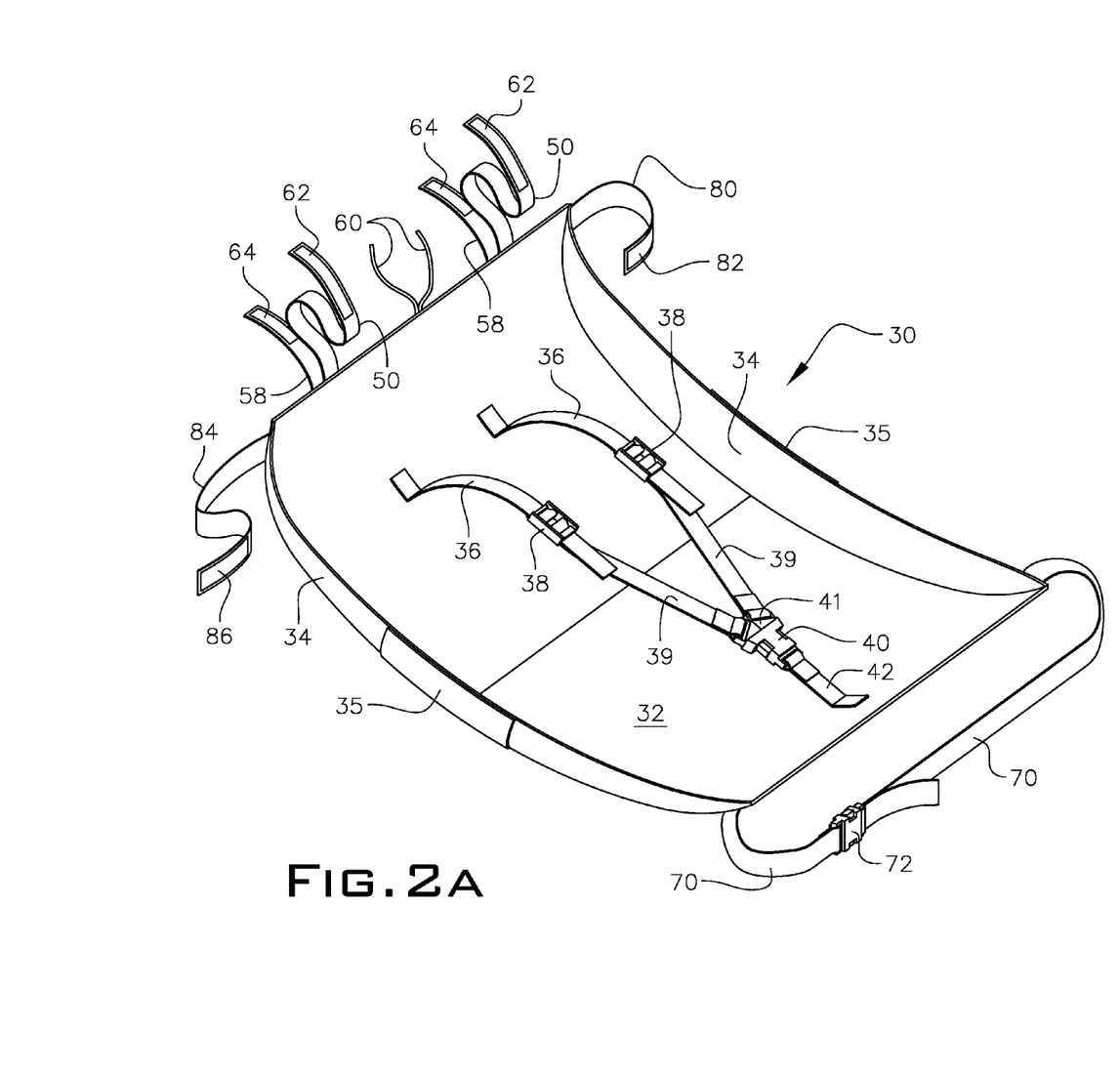
FIG. 2A illustrates a plan view of a safety seat of a second embodiment of the present invention.

Referring to FIG. 2A, a plan view of a safety seat of a second embodiment of the present invention will be described. The child safety seat 30 of this embodiment includes a substantially planar base portion 32 and two side portions 34. In some embodiments, pockets 35 are provided to store straps or hold small baby toys. A series of straps 36/39/42 are attached to the base portion for holding the child as known in the industry. The placement of such depends upon the age, size and weight of the child, also as known in the industry. In the preferred embodiment, two shoulder straps 36/39 are attached to the shoulder area of the child safety seat 30, in some embodiments by stitching or adhesive. To accommodate size differences in children, some embodiments include adjusters 38 on the straps 36/39 to allow for shortening and lengthening. At a point near the child's mid-section, the straps 39 meet at a snap lock 41 (male snap lock shown in this example). A mating snap lock 40 attaches to a crotch strap 42 and the crotch strap 42 is attached to the planar base portion 32 at a point between the child's legs. Opening of the snap lock 40/41 allows the straps 36/39 to be lifted over the child's head, for easy removal of the child from the restraint.

The child safety seat 30 is held suspended between two objects by a series of suspension straps 50/58/80/84/70 as is shown in subsequent figures. In this embodiment, the head-end primary suspension straps 50/58 include two top head-end primary suspension straps 50 and two bottom head-end primary suspension straps 58. The top head-end primary suspension straps 50 have an area of hook and loop material 62 such as Velcro®. The bottom head-end primary suspension straps 58 have an area of mating hook and loop material 64 such as Velcro®. To attach the primary head-end suspension straps 50/58 to an object such as an airplane tray table, the top head-end primary suspension straps 50 are passed around the object and held in place by connecting the hook and loop material 62 with the mating hook and loop material 64. In some embodiments, the hook and loop material 62/64 is a material known as snag-free or single Velcro, a hook and loop material that incorporates both hooks and loops into the same material allowing it to stick to itself.

Figure 4:
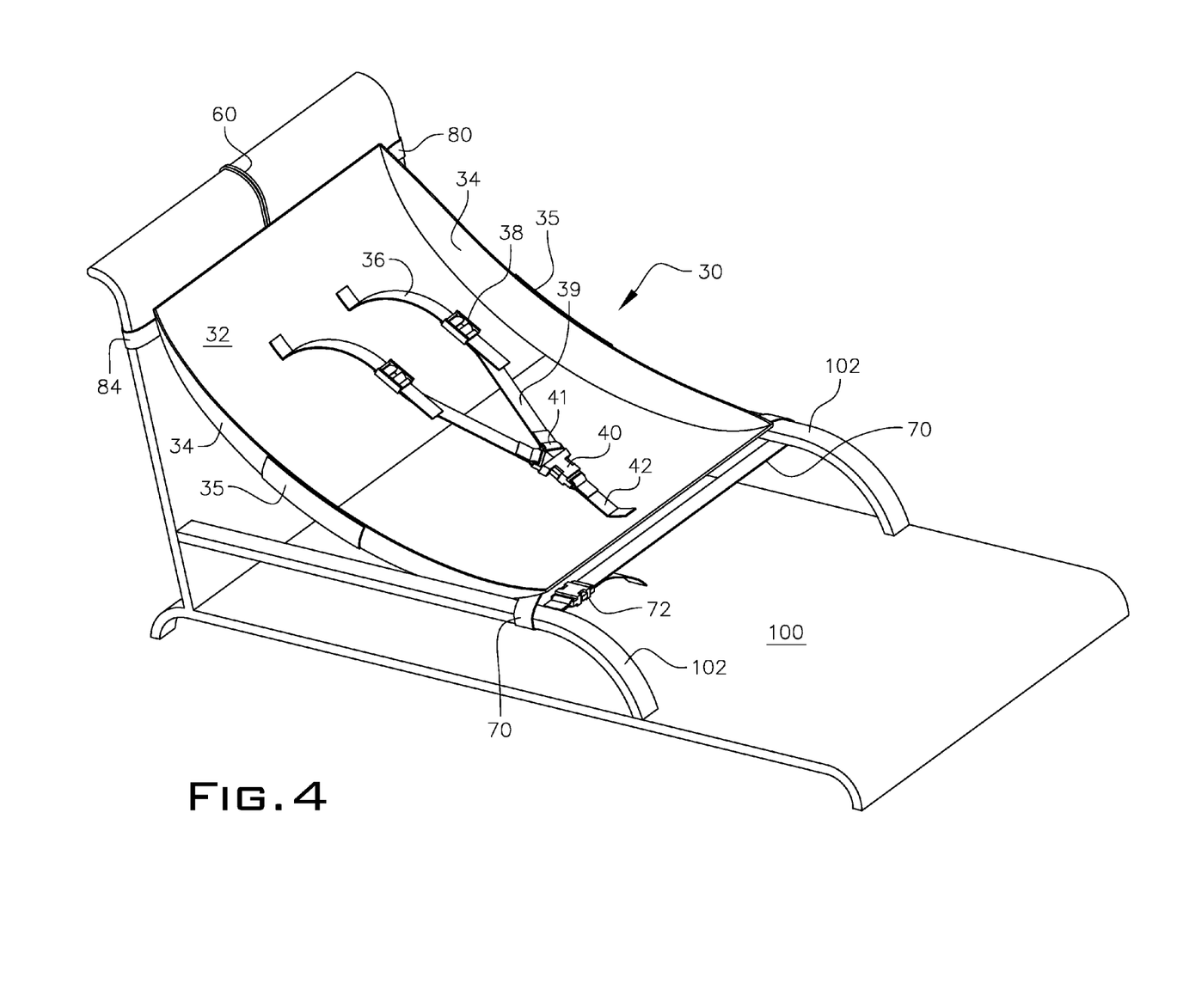
FIG. 4 illustrates a plan view of a safety seat of all embodiments of the present invention in use on a chaise lounge.
Figure 5:
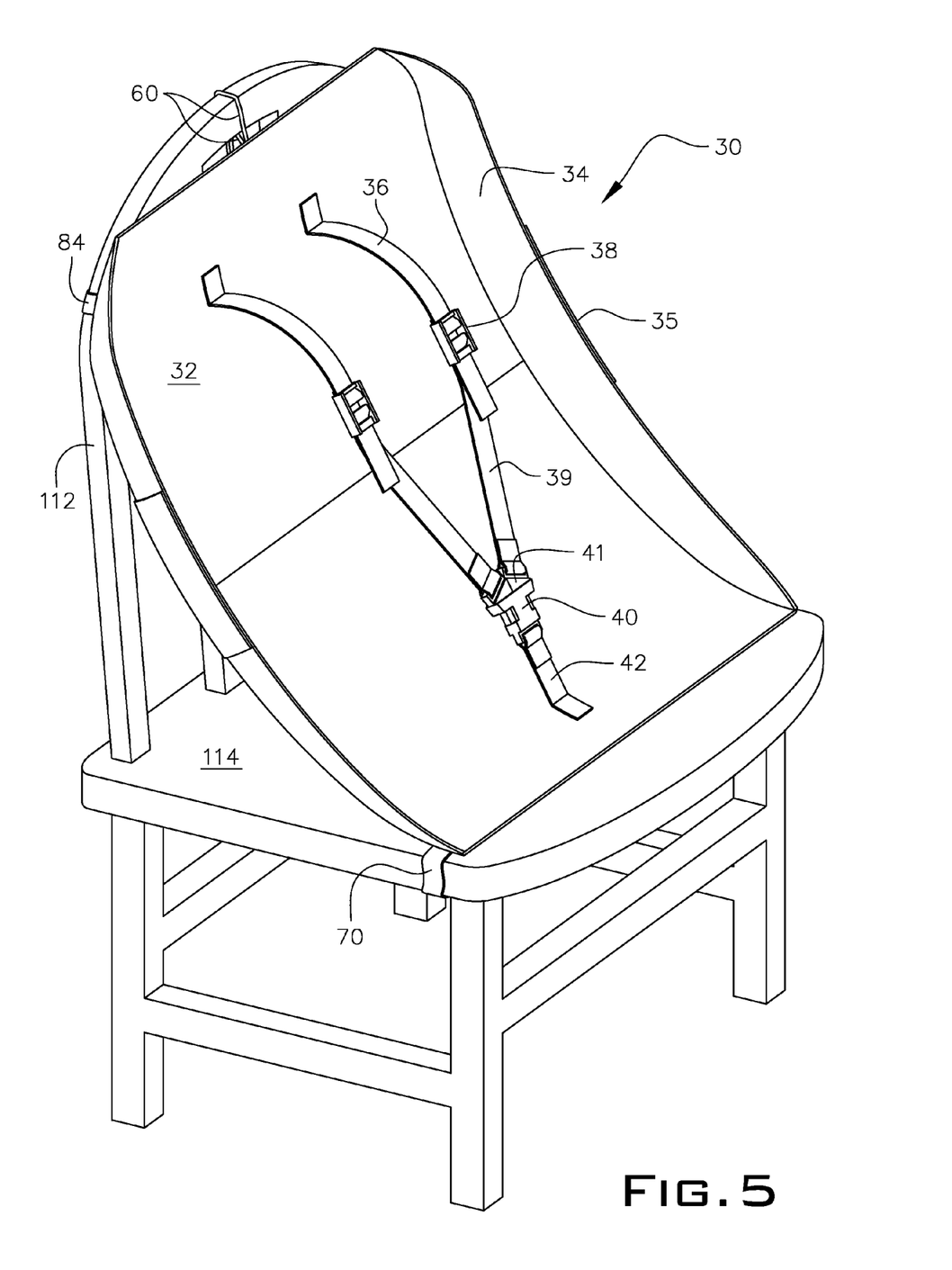
FIG. 5 illustrates a plan view of a safety seat of all embodiments of the present invention in use on a dinning room chair.

In some embodiments, extra head-end suspension tie strings 60 are provided for securing the child safety seat to alternate objects (see FIGS. 4 and 5).

For added strength and safety, a secondary head-end suspension strap 80/84 is provided. A first of the secondary head-end suspension straps 80 has an area of hook and loop material 82 such as Velcro®. The second head-end secondary suspension strap 84 has an area of mating hook and loop material 86 such as Velcro®. To attach the secondary head-end suspension straps 80/84 to an object such as an airplane tray table, the secondary head-end suspension straps 80/84 are passed around the object (e.g., tray table) and held in place by connecting the hook and loop material 82 with the mating hook and loop material 86. In alternate embodiments, the connection is made by any known connecting device in the industry including belt buckles/holes, slip rings, buttons/holes and the like.

For attaching to the other object of the two objects (e.g., a person's waist), a lower-end adjustable strap 70 is provided along with an adjustment device 72 such as a tensioner or a clip/tensioner. Any connection/tension adjusting device known in the industry is envisioned to be attached to the lower-end adjustable straps 70.

Figure 3:
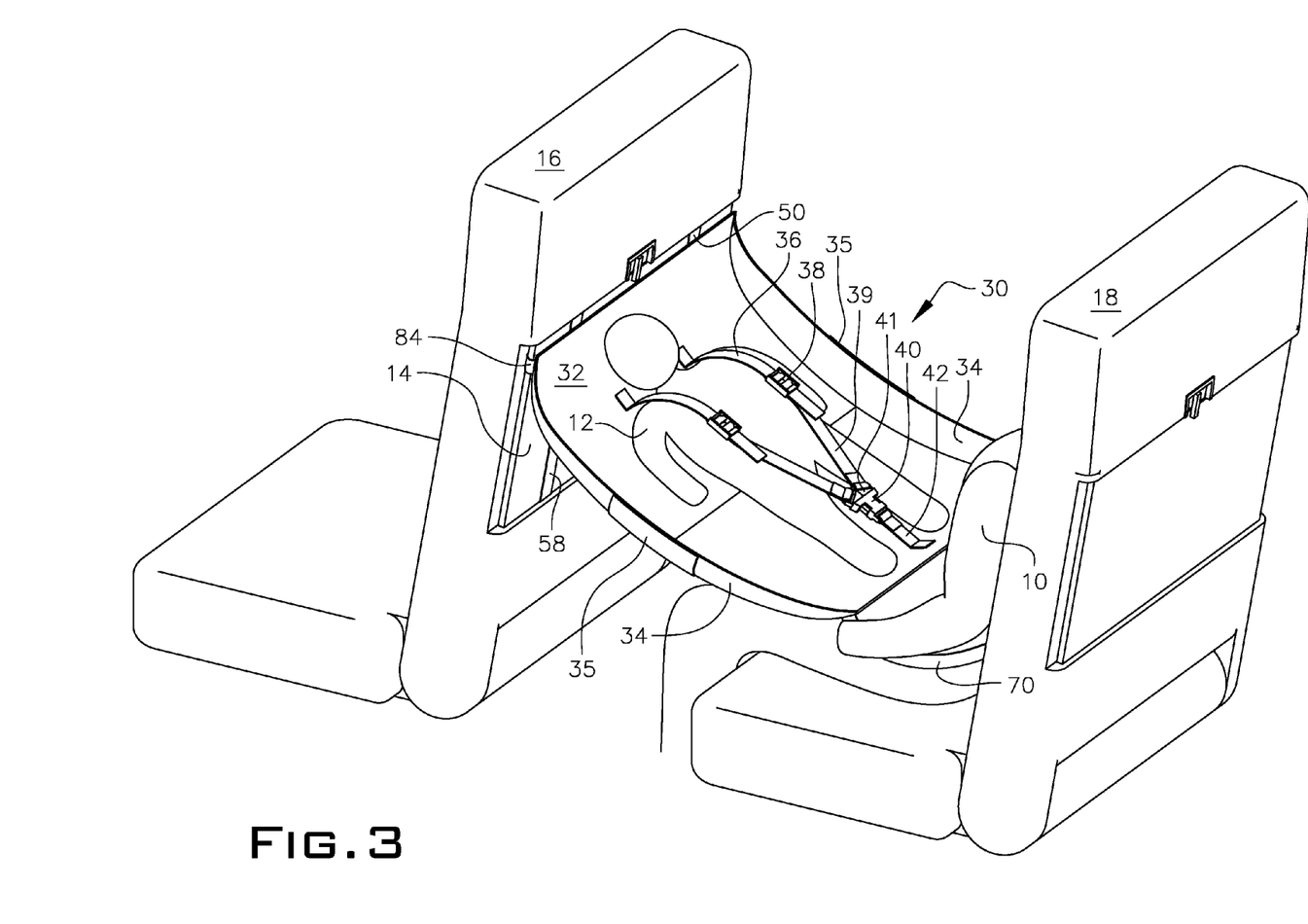
FIG. 3 illustrates a plan view of a safety seat of all embodiments of the present invention in use in an airplane.

Referring to FIG. 3, a plan view of a safety seat of all embodiments of the present invention in use in an airplane will be described. The primary head-end suspension straps 50/58 wrap vertically around the tray table 14 of the forward row airliner seat 16 while the secondary head-end suspension straps 80/84 wrap horizontally around the tray table 14 of the forward row airliner seat 16. The tray table 14 is then locked in its closed position, thereby suspending the head-end of the child safety seat 30 from the tray table 14. The parent 10 sitting in the following row seat 18 runs the waist strap 70 around their back and adjusts to the desired tightness with the tension adjuster 72. The child 12 is placed on the child safety seat 30 and strapped in with straps 36/39/42 that snap with snap 40/41 and the straps 36/39/42 are adjusted with strap adjusters 38.

Referring to FIG. 4, a plan view of a safety seat of all embodiments of the present invention in use on a chaise lounge will be described. In this use of the present invention, the child safety seat 30 is suspended from a chaise lounge chair 100. In this use, the primary head-end suspension straps are not used, but the secondary head-end suspension straps 80/84 are passed tightly around the head portion of the chaise lounge chair 100 and attached using the hook and loop material 82/86. In some embodiments, the extra head-end suspension tie strings 60 are tied to the head separation bar (not visible) of the chaise lounge chair 100 for added strength. The lower-end adjustable waist strap 70 is wrapped tightly around the chaise lounge chair's 100 arms 102 and tightened with the adjuster 72 to support the lower portion of the child safety seat 30.

Referring to FIG. 5, a plan view of a safety seat of all embodiments of the present invention in use on a dinning room chair 114 will be described. In this use, the primary head-end suspension straps are not used, but the secondary head-end suspension straps 80/84 are passed tightly around the back 112 of the dinning room chair 114 and attached using the hook and loop material 82/86. The extra head-end suspension tie strings 60 are tied around the top portion of the back 112 of the chair 114 for added strength. The lower-end adjustable waist strap 70 is wrapped tightly around the chair's 114 seat to support the lower portion of the child safety seat 30.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A foldable child seat comprising:
   a foldable and flexible concave base having a first end, a second end, a left side portion and a right side portion, the left side portion forming a wall along a left peripheral edge of the foldable and flexible concave base and the right side portion forming a wall along a right peripheral edge of the foldable and flexible concave base;
   at least one head-end strap attached to the first end of the foldable and flexible concave base, the at least one head-end strap adapted to removably fasten around a first anchoring object;
   at least one lower-end strap attached to the second end of the foldable and flexible concave base, the at least one lower-end strap adapted to removably fasten around a second anchoring object; and
   a child restraint system affixed to the foldable and flexible concave base, the child restraint system comprising a pair of shoulder straps for holding the shoulder and chest area of the child and a lower strap adapted to pass between the child's legs, the pair of shoulder straps and the lower strap joined by a snap connector.

2. The foldable child seat of claim 1, wherein the head-end secondary suspension straps are adapted to anchor the foldable child seat to an airplane tray table and the two lower-end straps are adapted to anchor the foldable child seat to a person seated behind the airplane tray table.

3. The foldable child seat of claim 2, wherein the at least one head-end strap includes one head-end secondary strap removably affixed horizontally around a first area of the airplane tray table and two head-end primary straps, a first head-end primary strap removably affixed vertically around a left area and a second head-end primary strap removably affixed vertically around a right area of an airplane tray table.

4. The foldable child seat of claim 1, wherein the head-end secondary suspension straps are adapted to anchor the foldable child seat to a head area of a lounge chair and the two lower-end straps are adapted to anchor the foldable child seat to arms of the lounge chair.

5. The foldable child seat of claim 1, wherein the foldable and flexible concave base is made from cloth.

6. The foldable child seat of claim 5, further comprising at least one pocket in one of the side portions.

7. The foldable child seat of claim 1, further comprising head-end suspension tie strings affixed to the head area of the foldable and flexible concave base for securing the child seat to a chair.

8. A foldable child seat comprising:
   a foldable and flexible means for supporting a child having a first end, a second end, a left side portion and a right side portion, the left side portion forming a wall along a left peripheral edge of the foldable and flexible means for supporting and having a concave base and the right side portion forming a wall along a right peripheral edge of foldable and flexible means for supporting;
   a means for removably fastening the first end of the foldable and flexible means for supporting the child around a first anchoring object;
   a means for removably fastening the second end of the foldable and flexible means for supporting the child around a second anchoring object, whereas the second anchoring object is a person; and
   a means for restraining the child attached to the foldable and flexible means for supporting the child.

9. The foldable child seat of claim 8, wherein the means for removably fastening the first end is adapted to anchor the foldable child seat to an airplane tray table and the means for removably fastening the second end is adapted to anchor the foldable child seat to a person seated behind the airplane tray table.

10. The foldable child seat of claim 9, wherein the means for removably fastening the first end includes one head-end secondary strap removably affixed horizontally around a first area of the airplane tray table and two head-end primary straps removably affixed vertically around a left area and a right area of an airplane tray table.

11. The foldable child seat of claim 8, wherein the means for removably fastening the first end is adapted to anchor the foldable child seat to a head area of a lounge chair and the means for removably fastening the second end is adapted to anchor the foldable child seat to arms of the lounge chair.

12. The foldable child seat of claim 8, wherein the foldable and flexible means for supporting the child is made from cloth.

13. A foldable child seat comprising:
   a foldable and flexible concave base having a first end, a second end, a left side portion and a right side portion, the left side portion forming a wall along a left peripheral edge of the foldable and flexible concave base and the right side portion forming a wall along a right peripheral edge of the foldable and flexible concave base;
   two head-end primary suspension straps attached to the first end of the foldable and flexible concave base, the head-end primary suspension straps adapted to removably fasten around a first anchoring object;
   head-end secondary suspension straps attached to the first end of the foldable and flexible concave base, the head-end secondary suspension straps adapted to removably fasten around the first anchoring object;
   two lower-end straps attached to the second end of the foldable and flexible concave base, the two lower-end straps adapted to removably fasten around a second anchoring object; and
   a child restraint system comprising two child restraint shoulder straps affixed to the foldable and flexible concave base at a first area of the foldable and flexible concave base, the two child restraint shoulder straps removably attached to a first end of a crotch strap, a second end of the crotch strap attached to a second area of the foldable and flexible concave base.

14. The foldable child seat of claim 13, wherein the head-end secondary suspension straps are adapted to anchor the foldable child seat to an airplane tray table and the two lower-end straps are adapted to anchor the foldable child seat to a person seated behind the airplane tray table.

15. The foldable child seat of claim 14, wherein the at least one head-end strap includes one head-end secondary strap removably affixed horizontally around a first area of the airplane tray table and two head-end primary straps removably affixed vertically around a left area and a right area of an airplane tray table.

16. The foldable child seat of claim 13, wherein the head-end secondary suspension straps are adapted to anchor the foldable child seat to a head area of a lounge chair and the two lower-end straps are adapted to anchor the foldable child seat to arms of the lounge chair.

17. The foldable child seat of claim 13, wherein the foldable and flexible concave base is made from cloth.

18. The foldable child seat of claim 13, further comprising at least one pocket in one of either the left side portion and the right side portion.

19. The child seat of claim 13, further comprising head-end suspension tie strings affixed to the head area of the foldable and flexible concave base for tying the head-end of the child seat to a chair.

* * * * *